US012613081B2

(12) United States Patent
Lane et al.

(10) Patent No.: US 12,613,081 B2
(45) Date of Patent: Apr. 28, 2026

(54) MOUNTING SYSTEM ADAPTER AND CHASSIS

(71) Applicant: On-Point Defense Technologies LLC, Fort Walton Beach, FL (US)

(72) Inventors: Jason R. Lane, Batesville, AR (US); Parker Wilson Adams, Clearwater, FL (US); Frank Wayne Tinklepaugh, Greenville, SC (US); Steven Louis Iezzi, Melbourne, FL (US)

(73) Assignee: ON-POINT DEFENSE TECHNOLOGIES LLC, Fort Walton Beach, FL (US)

( * ) Notice: Subject to any disclaimer, the term of this patent is extended or adjusted under 35 U.S.C. 154(b) by 285 days.

(21) Appl. No.: 18/588,377

(22) Filed: Feb. 27, 2024

(65) Prior Publication Data

US 2024/0337470 A1     Oct. 10, 2024

Related U.S. Application Data

(60) Provisional application No. 63/487,126, filed on Feb. 27, 2023.

(51) Int. Cl.
F41H 5/26          (2006.01)
G02B 23/12          (2006.01)

(52) U.S. Cl.
CPC ............. F41H 5/266 (2013.01); G02B 23/12 (2013.01)

(58) Field of Classification Search
CPC ................................ F41H 5/266; G02B 23/12
See application file for complete search history.

(56) References Cited

U.S. PATENT DOCUMENTS

| | | | | |
|---|---|---|---|---|
| 5,867,613 A | * | 2/1999 | Nishikubo | ............. H04N 19/00 |
| | | | | 348/E5.09 |
| 7,086,318 B1 | | 8/2006 | Darnall | |
| 2018/0124952 A1 | * | 5/2018 | Kiamilev | ............. H05K 7/1427 |
| 2020/0314388 A1 | * | 10/2020 | Kramer | ................... B60R 11/04 |

OTHER PUBLICATIONS

Conner, C., "Improved TOW Vehicle M901A1" retrieved http://afvdb.50megs.com/USA/itvm901.html.
Inspector General Department of Defense, "Modifications to the Tube-Launched, Optically Tracked, Wire-Command Missile Launcher for the Bradley Fighting Vehicle System," Report No. 98-165, Jun. 25, 1998, 33 pages.
"Detector-Dewar assembly", https://www.photonics.com/EDU/detector-Dewar_assembly/d3447, Photonics Dictionary, Photonics Marketplace, 2 pages.
PCT International Preliminary Search Report on Patentability in PCT/US2024/017418, mailed Nov. 13, 2025 (6 pages).

* cited by examiner

*Primary Examiner* — Phu Vu
(74) *Attorney, Agent, or Firm* — Lewis Rice LLC

(57)          ABSTRACT

A mounting system and method that provides simplified mounting points and attachment interfaces for associated components. Specifically, the system and method generally comprise a mounting system, including a new support chassis, which allows for a Forward Looking Infrared (FLIR) aiming system which was built to be placed in an infantry system for a TOW missile, to be used in a vehicle mounted ISU system.

19 Claims, 8 Drawing Sheets

MOUNTING SYSTEM ADAPTER AND CHASSIS

CROSS-REFERENCE TO RELATED APPLICATIONS

This application claims the benefit of U.S. Provisional Patent Application No. 63/487,126, filed on Feb. 27, 2023, the entire disclosure of which is herein incorporated by reference.

BACKGROUND

1. Field of the Invention

This disclosure is related to the field of mounting systems for optical devices, and more particularly to mounting systems allowing for a night-vision targeting system for use with a tripod mounted TOW missile launcher to be utilized in a vehicle mounted TOW missile launcher.

2. Description of the Related Art

Produced since 1970, the TOW ("Tube-launched, Optically tracked, Wire-guided") missile is one of the most utilized guided anti-tank missiles in the world. The concept of the weapon is relatively straight-forward. The missile is mounted inside a dedicated launch tube which is aimed at the target. Aiming is typically accomplished by a human operator utilizing a Target Acquisition System (TAS) which provides some form of a visual sight either relying ON daylight or infrared (IR) night-vision. When triggered, the missile leaves the launch tube and is propelled toward the target. Originally, the missile would trail guiding wires through which communication information could be sent from the launcher to the missile. More modern versions, however, can now use wireless signals in the same way.

An infrared (IR) beacon in the missile's tail is located by the TAS and provided to a Flight Control Subsystem (FCS) which allows the location of the missile to be tracked during flight and that allows for the flight to be adjusted based on the position of the reticle in the aiming system. The reticle is maintained on the target during the missile's flight by the operator and this steers the missile. Feedback between the operator's positioning of the reticle and the detected position of the missile is transmitted via the wires or wireless connection to flight surfaces of the missile to allow it to be directed into the target identified by the reticle positioning. Specifically, that it will impact the point indicated by the operator as the target.

TOW missiles are very versatile with one of the key aspects of their value and pervasiveness being their ability to be launched from a variety of platforms. These include where the missile is launched by infantry from a modular tripod mount that breaks down into a number of components, to use on secondary mounts for vehicles, to use on dedicated armored vehicles designed to utilize TOW missiles as their primary armament. While these systems all ultimately utilize the same missiles, it is important to recognize that their support systems, and specifically their TAS, are often quite different.

For TOW missiles, the ability to hit the target is primarily dependent on the ability of the human operator to keep the missile on course after it is fired for it to hit where the reticle is positioned. Properly calibrated and sighted-in, so long as the feedback systems work, the missile should hit the intended target so long as the operator keeps the target in the reticle. Because of this, the ability of the operator to both accurately see the intended target and to keep the sight on the target as the missile travels are both paramount to successful operation.

In TOW missile systems, the operator will principally utilize visual aiming. TOW missiles have traditionally utilized visual aiming using both daylight (natural or visual light) systems and night vision Forward Looking Infrared (FLIR) aiming systems. Both systems seek to obtain light waves emitted or reflected by the target and then feed those light waves through an optical pathway to an eyepiece which can be used by the operator. Use of an eyepiece provides for good focus, and allows for information to be superimposed on the image collected. This traditionally has included the targeting reticle.

While the targeting systems are broadly similar for each type of TOW system, they are also different. The most noticeable difference is how the operator interacts with the TAS. In an infantry tripod system, the aiming system typically needs to be lightweight and will generally be directly attached to the missile tube on the tripod mount. This provides for simple and effective operation as well as ease of use. Even in situations where the missile may be launched using a controller which is separated from the tube, the TAS will still typically be on the tube. Placing the aiming system on the tube eliminates any concerns of correctly calibrating (sighting in) an aiming system which is spaced from the tube and would be separately positioned. Joining the two components together allows for a rigid mechanical interconnection which does a much more effective job of aligning the components in a consistent fashion when assembled at the point of firing than could ever be obtained if they were positioned in separate locations.

This direct connection is, however, not present, and typically undesirable, in a vehicle mount. In a vehicle mount, the operator will typically want to be inside the vehicle so as to be protected by its armor (under armor) as this is, in many respects, the point of utilizing an armored vehicle at all. However, with the tube placed outside the vehicle's armor (and often on a moveable turret), the aiming system will generally need to collect light from a dedicated viewing area (a periscope), and then provide the light to a control system (including the eyepiece) inside the vehicle.

Because the vehicle is itself a rigid platform with its own motive control, systems in vehicles can utilize different relative positioning as the positioning of the components can be fixed by the structure of the vehicle and the systems themselves can be heavier as they need not be transported by individuals directly. This, in turn, means that vehicle mount systems can include additional functionality which can potentially be used to make them more accurate, safer, or simply different in operation. This can include secondary control to allow for a commander to both monitor and potentially intervene in the use of the TOW missile.

Vehicle mounted systems can include similar components to its infantry counterpart such as daylight and night-vision targeting. These components are typically mounted in an Integrated Sight Unit (ISU). An ISU is typically physically separated from the missile tube but because it is rigidly positioned on the vehicle and the tube is also positioned in a fixed position on the vehicle (or at least on a mount which is in fixed position even if the mount can be moved within fixed constraints), aiming by the ISU can be readily communicated to both the tube and the missile once fired. In order to collect light information (where visual or IR), the ISU will typically utilize a periscope which allows for light outside the vehicle to be collected and fed into the optics of the ISU. This may be directly, but mirrors will commonly be used to deal with the necessity of altering the light's direction to provide the light spectrum to a light path that ultimately feed the ISU.

It has been recognized that the night vision capability of the modern tripod mounted version of TOW systems typically provides better resolution and clearer visibility than the vehicle mounted version. The improved resolution of the infantry system, however, cannot be readily transferred over to the vehicle mount because the ISU system had a number of specialty requirements that the infantry system did not include. This results in differences in available space in the ISU housing compared to an infantry housing. For example, the infantry system utilizes an eyepiece which moves with the tube on the tripod and is specific to the night vision system (with the daylight system mounted separately), while the ISU uses a reticle projector to a fixed eyepiece in the ISU through which both sighting systems are used. The ISU also has mechanical adjustments to translate adjustments made with control knobs on the ISU which alter positions of remote components and specifically the reticle projector.

In the infantry tripod system, movement of the aiming system typically resulted in identical movement of the tube since the sight and tube are co-mounted on the tripod. This change necessarily makes it slightly harder to keep the reticle aligned with the image compared to the rigid ISU since the large tube has to be moved to adjust the targeting. Similarly, the need to send the same optical image to both the operator and to a separate command module which is an integral part of a vehicle ISU is not present in the infantry version. These differences mean that it was traditionally not possible to utilize the improved night vision system constructed to fit in the infantry tripod mount in a vehicle mount ISU.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

The present disclosure relates generally to an improved mounting system and provides simplified mounting points and attachment interfaces for associated components. Specifically, the system generally comprises an improved mounting system, including a new support chassis, which allows for a Forward Looking Infrared (FLIR) system built to used with an infantry tripod mount for a TOW missile, to be used in a vehicle mounted Integrated Sight Unit (ISU). The transferred components will typically include just the night vision components (namely the FLIR system), but this is by no means required and the transfer can also incorporate a variety of other systems.

The improved mounting system according to the various embodiments is configured to leverage existing ISU mounting points, thereby providing simplified attachment interfaces for updated subcomponents without the need for any modification to underlying structures, such as the ISU housing. This advantageously not only simplifies retrofit and/or upgrade procedures, but also significantly reduces material and labor costs. This also advantageously improves the ruggedness of associated components as the adapters of the improved mounting system not only provide shielding capabilities, but can also include thermal and shock dissipation and wire routing structural components not previously provided.

There is described herein, among other things, a conversion methodology for converting a night vision system from an infantry mount to a vehicle mount, the methodology comprising: providing a night vision system for a tripod-mounted TOW missile system; removing the night vision system from the tripod-mounted TOW missile system; mounting optical components of the night vision system on a new chassis in a same relative position; positioning an Integrated Detector Dewar Cooler Assembly (IDDCA) from the night vision system in an IDDCA support; attaching the IDDCA support to the new chassis in a manner which reorients and translates the IDDCA relative to the optical components; removing an existing night vision system including a reticle projector from an Integrated Sight Unit (ISU) in a vehicle; placing the IDDCA support and the new chassis into a space vacated by the existing night vision system in the ISU; after the placing, viewing output of the IDDCA via a plurality of eyepieces originally used for viewing output of the existing night vision system of the ISU.

In an embodiment, the conversion methodology further comprises positioning a video image processing (VIP) card in an electronics mounting assembly; and attaching the electronics mounting assembly to the new chassis.

In an embodiment of the conversion methodology the electronics mounting assembly comprises three separate pieces.

In an embodiment of the conversion methodology the three separate pieces either support a top and bottom of the VIP card.

In an embodiment of the conversion methodology the electronics mounting assembly attaches to the new chassis at a side of the chassis different from the IDDCA support.

In an embodiment of the conversion methodology the electronics mounting assembly includes a video combiner card for adding a software reticle to a video image produced by the VIP card.

In an embodiment of the conversion methodology the video image with the software reticle is visible to an existing beam splitter of the ISU for providing the video image with the software reticle to both an operator's eyepiece and a commander's eyepiece.

In an embodiment of the conversion methodology the video image with the software reticle is displayed on an organic light emitting diode (OLED) screen.

In an embodiment of the conversion methodology the output of the VIP card is displayed on an organic light emitting diode (OLED) screen.

In an embodiment of the conversion methodology the optical components of the night vision system mounted on the new chassis in the same relative position include a fold mirror and a scan mirror.

There is also described herein, in an embodiment, a conversion system for converting a night vision system from an infantry mount to a vehicle mount, the system comprising: a new chassis, the new chassis mounting optical components of the night vision system in a same relative position; an Integrated Detector Dewar Cooler Assembly (IDDCA) support, the IDDCA support mounting an IDDCA of the night vision system, the IDDCA support attached to the new chassis; and an electronics mounting assembly mounting a video image processing (VIP) card of the night vision system, the electronics mounting assembly attached to the new chassis; wherein the night vision system is removed from a tripod-mounted TOW missile system; wherein the conversion system is mounted into a housing for an Integrated Sight Unit (ISU) in a vehicle from which an existing night vision system including a reticle projector was removed; and wherein output of the IDDCA is viewed via a plurality of eyepieces of the ISU.

In an embodiment of the conversion system, the electronics mounting assembly comprises three separate pieces.

In an embodiment of the conversion system, the three separate pieces either support a top and bottom of the VIP card.

In an embodiment of the conversion system, the electronics mounting assembly attaches to the new chassis at a side of the chassis different from the IDDCA support.

In an embodiment of the conversion system, the electronics mounting assembly includes a video combiner card for adding a software reticle to a video image produced by the VIP card.

In an embodiment of the conversion system, the video image with the software reticle is visible to an existing beam splitter of the ISU for providing the video image with the software reticle to both an operator's eyepiece and a commander's eyepiece.

In an embodiment of the conversion system, the video image with the software reticle is displayed on an organic light emitting diode (OLED) screen.

In an embodiment of the conversion system, the output of the VIP card is displayed on an organic light emitting diode (OLED) screen.

In an embodiment of the conversion system, the optical components of the night vision system mounted on the new chassis in the same relative position include a fold mirror and a scan mirror.

DESCRIPTION OF THE PREFERRED EMBODIMENT(S)

Figure 1:
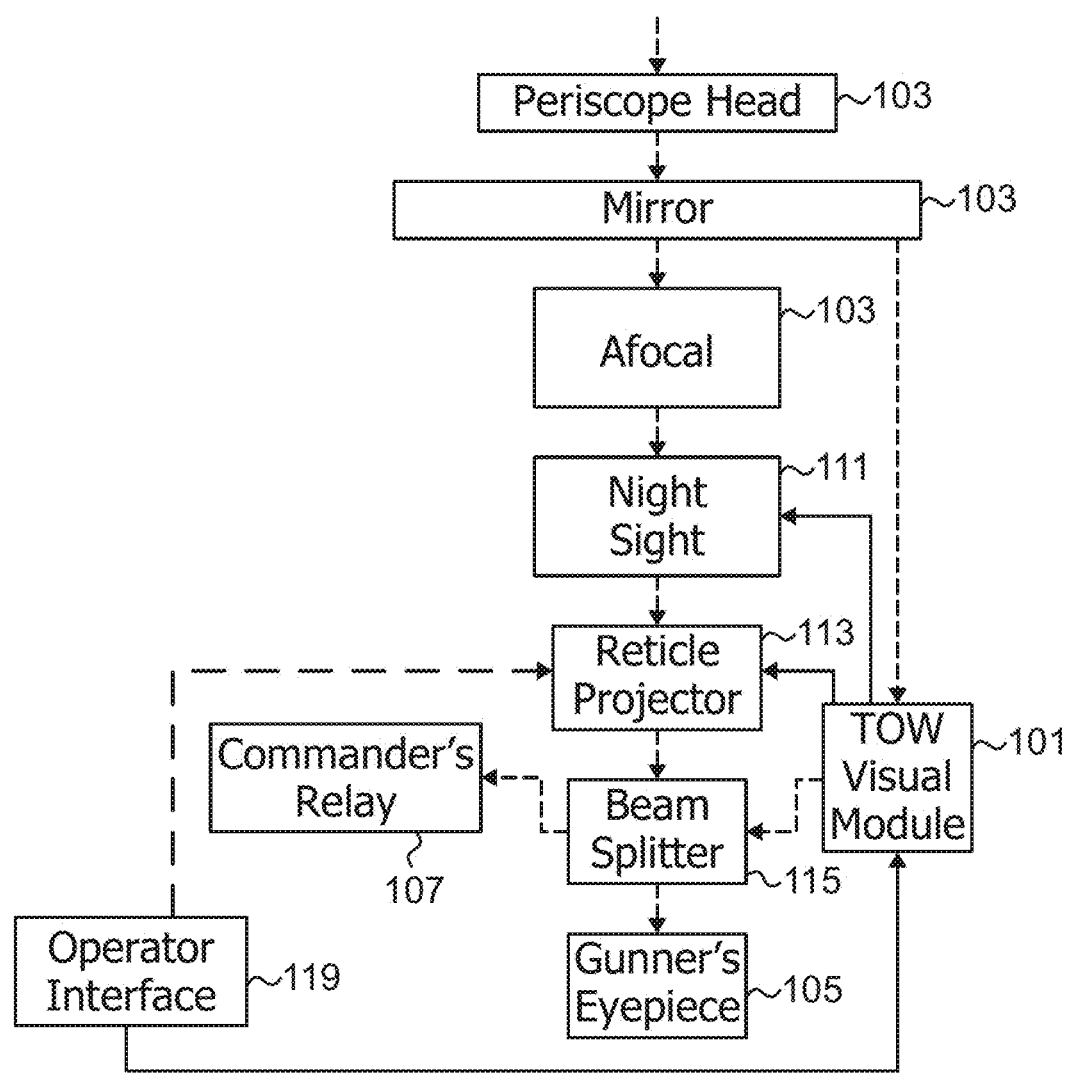
FIG. 1 Comprises a general block diagram showing the high level components of a current Integrated Sight Unit (ISU) of a type present in a number of American military vehicles.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matters contained in the description or shown in the accompanying drawings shall be interpreted as illustrative and not in a limiting sense.

One of the primary elements of the mounting of the Forward Looking Infrared (FLIR) elements from the infantry launch system of a TOW into the vehicle Integrated Sight Unit (ISU) is recognizing that a new FLIR system, with a configuration designed for a different mounting (and in some respects use) is to be mounted into the ISU system in a location which was built to house a different FLIR system. However, for the alternative FLIR system to be most useful, the components of the system which the operator interacts with need to stay as similar as possible. In this way, there is no need to retrain a skilled operator on the new FLIR system, as it will work in the same manner as expected. This also serves to retain valuable know-how of the operator with regards to the existing system To more fully understand what needs to be retained, the reader is directed to FIGS. 1-3 which provide, in FIG. 1, a general block diagram of the components of a vehicle mounted targeting system including components within the ISU related to night vision. In FIG. 2 an exploded view of a current ISU, and in FIG. 3 an optical block diagram of light flow through an existing ISU. Across the various figures, it is desirable to maintain all elements of the daylight targeting system (101), since this is not affected by replacement of the FLIR night-vision system. It is also desirable to maintain the initial light focusing components (103) since these are used for initial light (either visual or IR) collection. Further, in order to simplify use by the operator, the optical output, namely the operator's eyepiece (105) and commander's relay and eyepiece (107), should be maintained. Finally, the actual housing (109) should be retained ideally without modification since it is already fit into the vehicle. While the above indicates components to be maintained, removal of the existing night-vision system (111) is obviously necessary. Further, removal of the current reticle projector (113) frees up additional space. However, adjustments to aiming on the ISU system (since the ISU housing (109) was not itself moved in tandem with the missile tube) were performed by mechanical knobs and controls (119) that also need to be maintained for aiming, but their function and interface will need to be replaced.

Figure 3:
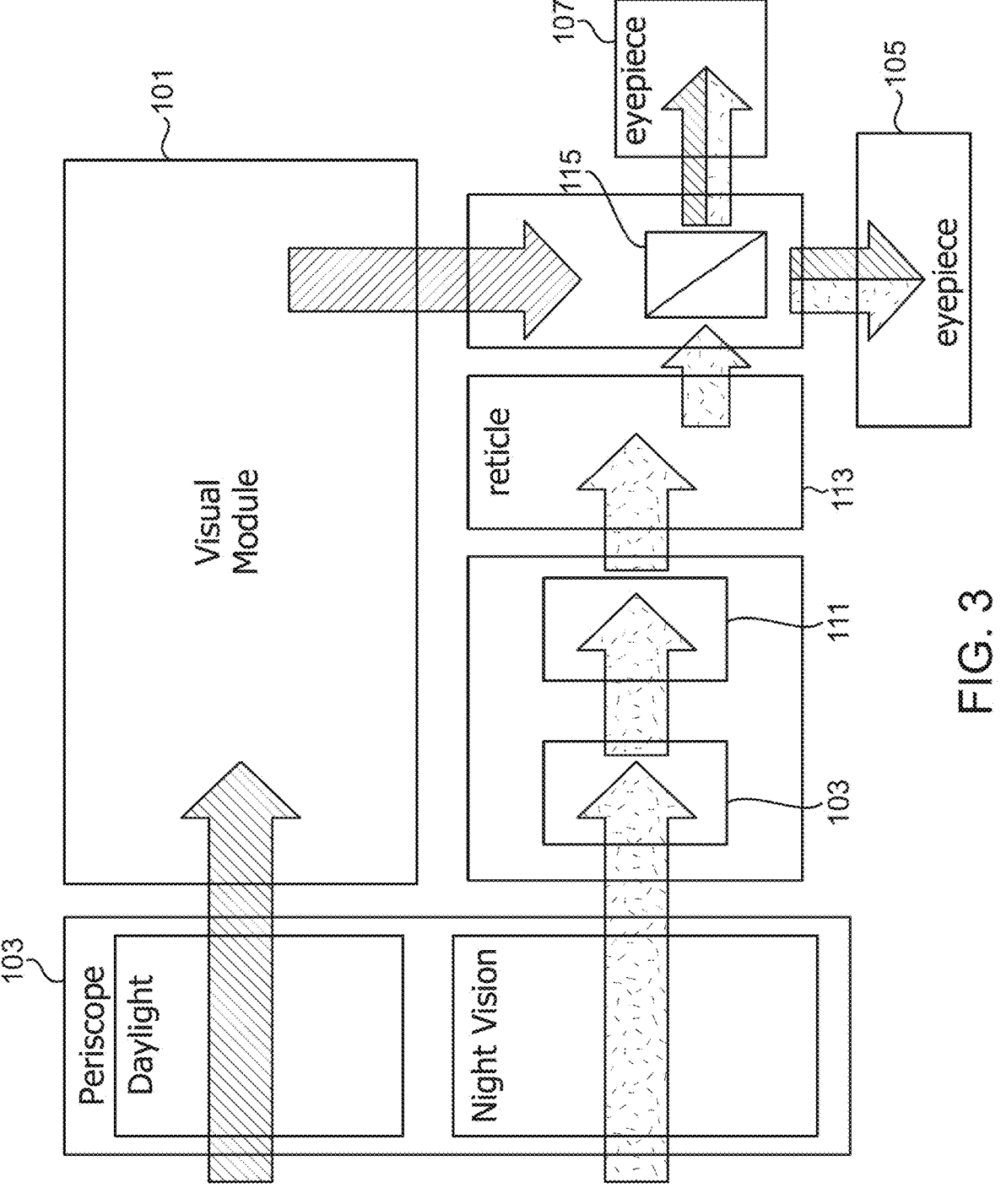
FIG. 3 Shows a view of the optical path of the ISU of FIG. 1.
Figure 4:
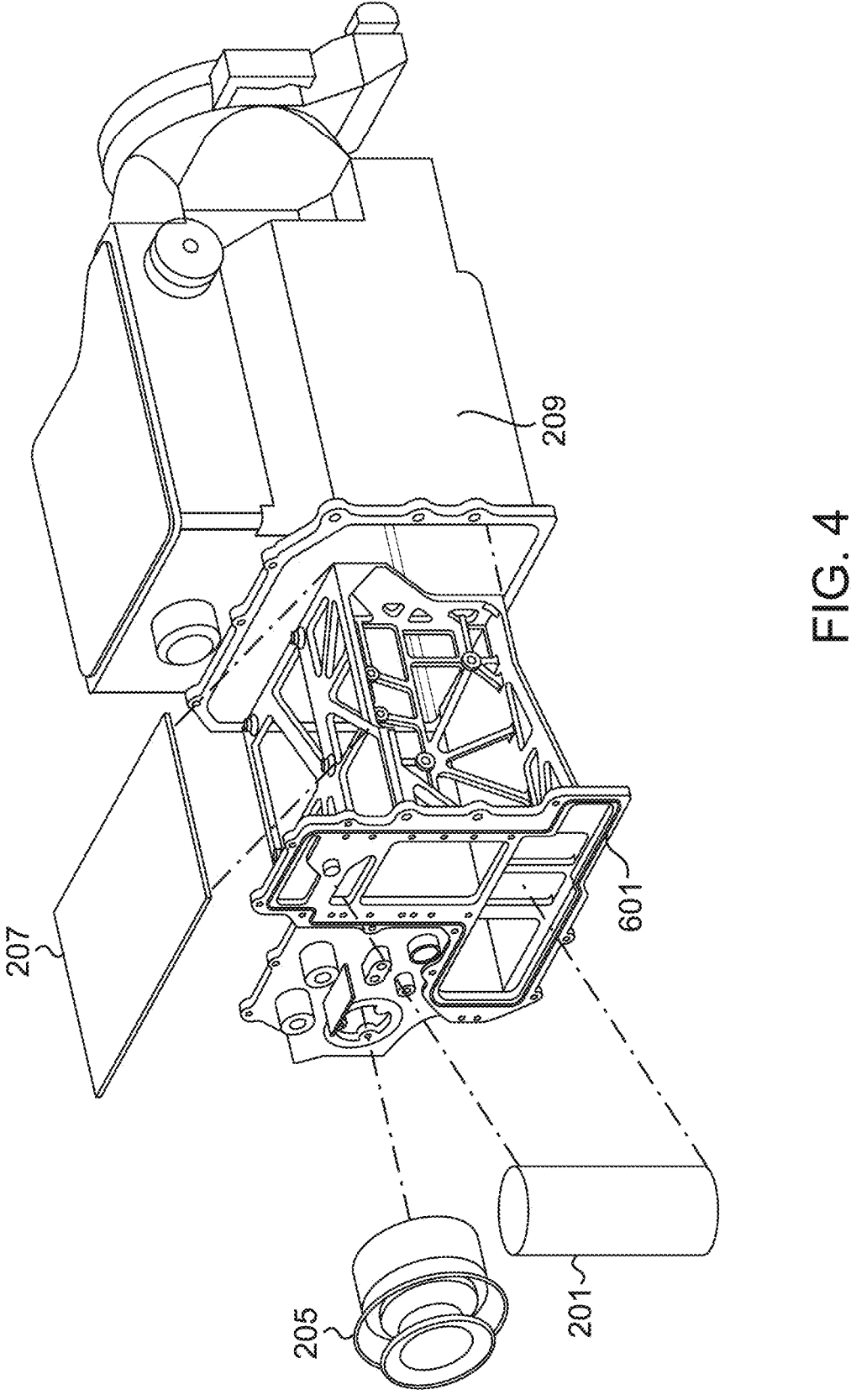
FIG. 4 Shows a partially view of the night vision part of the sighting system for an infantry tripod mount with the legacy chassis supporting the Forward Looking Infrared (FLIR) components removed from the housing.

FIG. 4 shows an infantry system with the existing chassis that supports the night vision components separated from the housing (209). In this FIG. 4, the FLIR system components which would be mounted on this chassis need to be used in the new system and maintained in their relative configuration. This includes the Integrated Detector Dewar Cooler Assembly (IDDCA) (201) which is mounted at point (601). The infantry eyepiece (205) needs to be removed and, effectively, replaced with the operator's eyepiece (105). However, the output of the FLIR here will need to be able to be visible by both the operator's eyepiece (105) and the commander's eyepiece (107) which is most easily done by maintenance of the existing beam splitter (115) visible in FIG. 3. The image viewed via the beam splitter (115) will typically be via a new display which is provided video from the original infantry system which video is then combined with a reticle image to replace the reticle projector (113). To provide imagery from the IDDCA to the new display, a Video Image Processing (VIP) circuit (207) of the original infantry system should be preserved. Additional electronics will also need to be added to provide for both the reticle functionality and to interface with any additional components.

While electrical and power linkages will generally need to be maintained as contemplated for the displays, these are relatively simple to adapt. The most sensitive components of the modification involve the optical (light) data as this is directly related to the accuracy of aiming and the housing's (109) rigidity provides the most problems for maintaining these elements. This disclosure, thus, will focus on dealing with the necessary modification to allow the optical (and specifically infrared (IR)) path from the existing vehicle mounted focal system (periscope and initial focusing components) (103) to be correctly fed into the new FLIR components from the infantry system, processed and combined with a new reticle, and the result displayed on a display visible to the original ISU beam splitter (115) which will then provide the image to both the existing operator's (105) and commander's (107) eyepieces. In this way, an operator trained to utilize the existing ISU does not need to be retrained on the converted or updated system as the system still functions essentially identically as the old one (but with improved optics). Further, the system can also be targeted using daylight (visual light) without any modification to those systems which are not altered.

Figure 2:
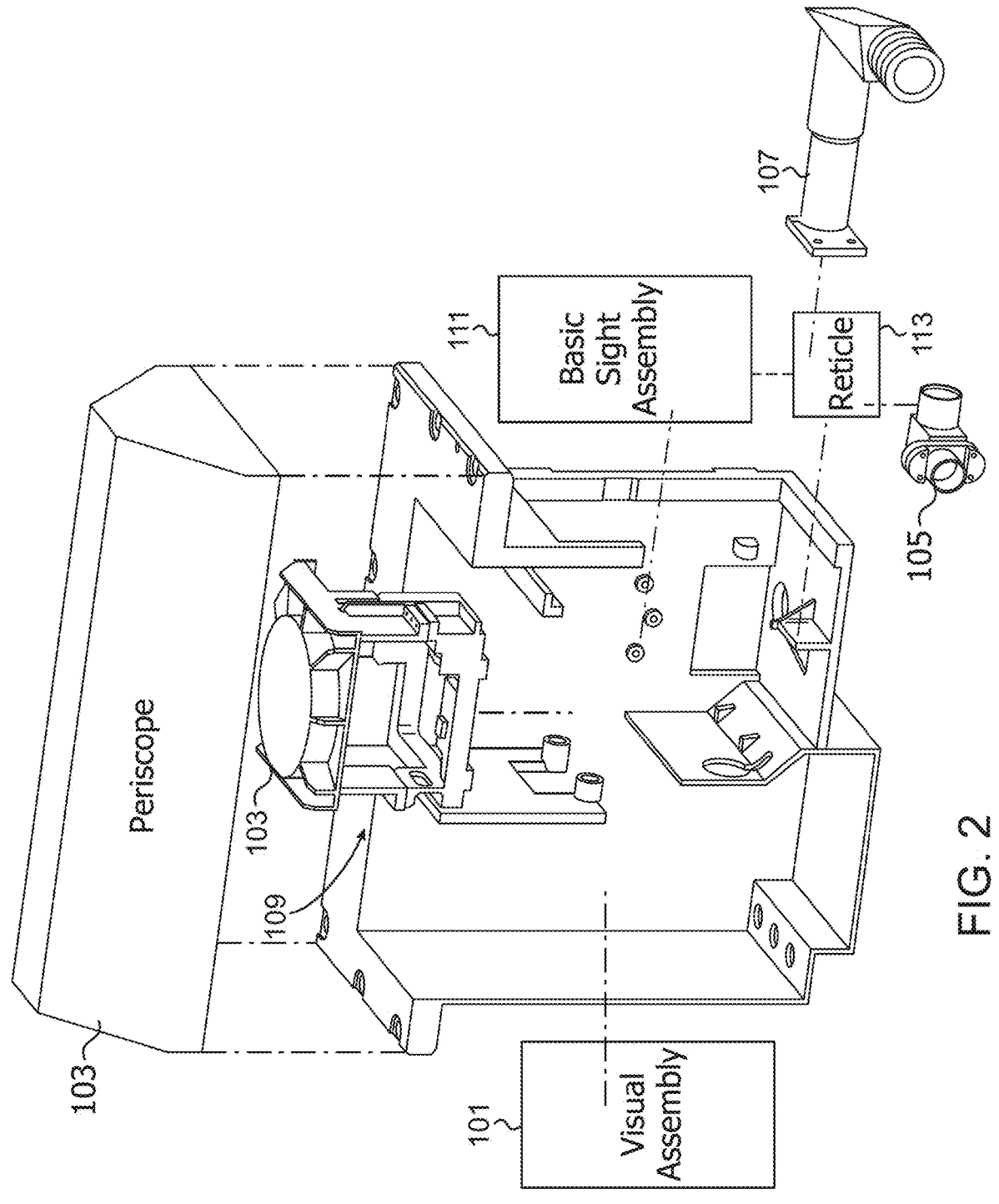
FIG. 2 Shows an exploded view of the high level components of the ISU of FIG. 1.

If one examines FIGS. 1-3, it should be apparent that IR radiation will generally be directed by a mirror from the periscope (where it is collected) and into an initial focusing system of which all components (103) are left unaltered. As can also be seen in FIGS. 1-3, after the initial focusing components of the ISU, the main components of this IR imaging night vision system (111) will be removed as their functionality will be replaced by the new system. In the infantry version, similar initial focusing components to those components (103) in the ISU system are present, they are just differently oriented based on collection of light from a different orientation. However, with removing of the targeting reticle (115) of the existing system, the new infantry installation will need to utilize video imagery with a combined display which is viewable via the existing eyepieces (105) and (107) as contemplated above. Once components have been removed, the size of available space with int the ISU housing (109) is clear. The replacement system then needs to fit into this area. Further, the position of the input from the focusing optics (103) and output to the beam splitter (115) for viewing is known.

As indicated above in conjunction with FIG. 4, the infantry night vision system comprises a number of subcomponents whose relative position needs to be maintained to provide for accurate optical transmission and handling. The specific purpose of each of these is not particularly important here as this relative positioning can be maintained as discussed later. However, these components include elements such as, but not limited to, the fold mirror and scan mirror. These elements form the FLIR system which replaces the system (111) whose internal optical path whose output is provided to the beam splitter (115).

Figure 5:
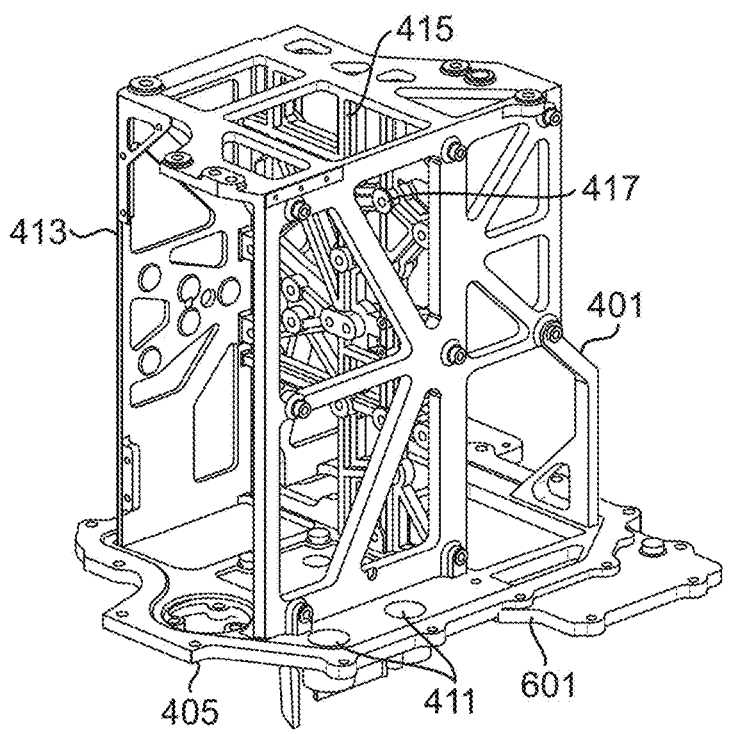
FIG. 5 Shows a perspective view of the legacy chassis used for mounting the FLIR components into an infantry tripod mount of FIG. 4 rotated into a position which would be necessary to interface with existing optical pathways of an ISU.

FIG. 5 shows the chassis (401) for mounting the components in the infantry housing. However, it has been rotated from the orientation of FIG. 4 to better show how components attached thereto need to be positioned in the ISU. As can be seen in FIG. 5, the chassis (401) includes elements such as for mounting (405) of the eyepiece (205) as well as for mounting (411) of various mechanical controls (119). The chassis (401) also includes a protective framework (413) to assist in protecting and positioning the optical components (which are mounted on the plate section (415) and within the protective framework (413)) to provide the necessary optical pathway. In effect, the value of the chassis (401) is that mounting the FLIR components to the chassis (401) provides for the optical path to be simply and repeatedly created and provides a level of ruggedness of the system which inhibits vibration from causing internal relative movement resulting inaccurate aiming.

As contemplated above in conjunction with FIG. 1-3, there is no need to provide for an eyepiece (205) or controls or other operator components when the FLIR components are moved to the ISU. In the ISU, those mechanical components (119) are already present and mounted in the existing housing (109) and as contemplated above, this arrangement needs to be preserved. Further, the existing eyepieces (105) and (107) need to functionally replace the eyepiece (205). However, the optical path of the FLIR also needs to be preserved, and that path needs to be made to integrate with the existing optical path of the ISU both to make sure that optical signals are correctly collected from the integral focusing elements (103) and are provided to the existing eyepieces of both the operator (105) and commander (107).

Figure 6:
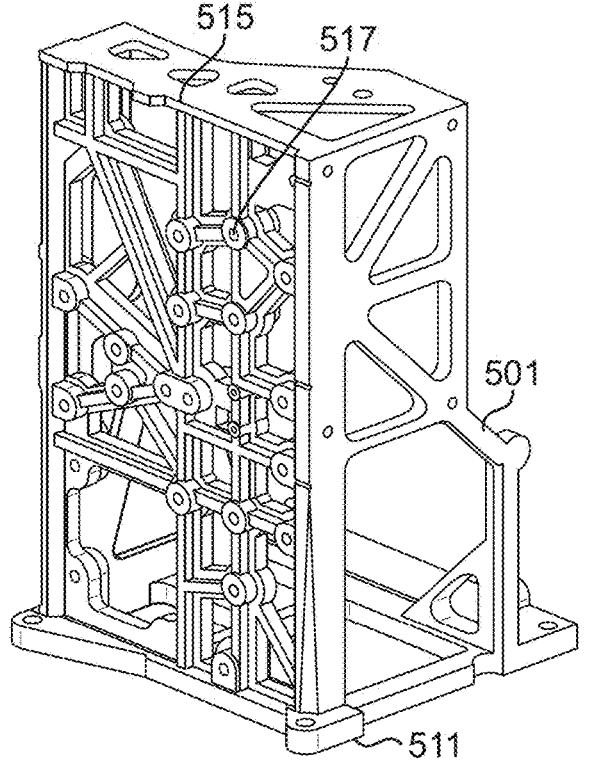
FIG. 6 shows a perspective view of an embodiment of a new chassis used for mounting the FLIR from FIG. 5 in an ISU taking advantage of the existing optical pathways.

FIG. 6 provides for a first embodiment of a chassis (501) for mounting the BSA components from the infantry mount into the ISU. The chassis of FIG. 6 is designed to support the same optics, detector, and scanner of the infantry FLIR system in the original positions. The IDDCA (201), however, needs to be moved as an existing piece of the ISU housing is in the way for positioning it in the same position as in FIG. 5. In order to provide an image, collected IR information must be fed into a cryogenic cooler (IDDCA) to lower the detector temperature to cryogenic temperatures and reduce the heat-induced noise to a level lower than that of the signal emitted by the scene. However, making sure the IR radiation is correctly fed into this element is paramount and the IDDCA element is a fixed component which cannot be physically altered or replaced with another without substantial additional modification being made.

Further, to interface with the ISU, the chassis (501) is sized and shaped to fit into the opening vacated by removal of the existing night-sight equipment (111) and the original reticle projection system (113). Instead of the existing reticle projection (113), the chassis (501) utilizes a video combiner to feed information to a display. That display is then viewed through the existing eyepieces' optical path (namely the beam splitter (115)). As the optical path for the original eyepieces (105) and (107) can be preserved the new system can basically be dropped into position.

To provide a reticle, the Video Imaging Processing (VIP) card of the tripod mount system is used to provide an image to a new display. This display is viewable through the existing eyepieces (105) and (107). However, it is further necessary to alter the adjustment components of the prior reticle (113) to provide the image on the display with a reticle. Specifically, the original reticle (113) was adjusted via the mechanical linkages (119) of the targeting reticle (113) and those components will need to be replaced with a digital interface that can translate the mechanical movements of the controls (119), which originally mechanically moved the reticle projector (113), into digital alterations on the display. This capability is provided via various electronic boards added as contemplated in FIG. 8 Further, the existing Video Image Processing (VIP) card (207), which serves to generate and provide the image from the FLIR components from the tripod mount, will need to be preserved to make sure that the output of the infantry system is preserved.

The chassis of FIG. 6 generally provides for a 90 degree reorientation of the components relative to the infantry mount of FIG. 4. To best illustrate similarity and changes between the old and new chassis, the orientation of the infantry chassis (401) to the new chassis (501) is preserved between FIGS. 5 and 6. The reorientation between FIGS. 4 and 5 is simply because in the ISU arrangement, the incoming optical path (103) is above the location of the chassis and the eyepieces (105) and (107) are below based on the relative positioning of the ISU relative to the vehicle itself. In the infantry housing (209), the operator would be behind the system with the optical path being directed from directly in front of the operator as opposed to be substantially above them in the ISU housing (109).

The new chassis (500) comprises a generally planar main mounting section (515) which is generally rectangular and generally corresponds to the plate section (415) of the infantry chassis (401). The main mounting section (515) will comprise a series of mounting points (517) which also generally correspond in position to the mounting points (417) of FIG. 5. These points (517) are, thus, intended to generally mimic the correspond mounting points (417) of the main mounting section (415) of the infantry chassis (401) to allow for the main FLIR components such as, but not limited to, the fold mirror and scan mirror, to be similarly positioned and attached maintaining the optical pathway through the FLIR components. However, as can be clearly seen by comparing FIG. 5 to FIG. 6, the protective framework (413) of the infantry design is unnecessary and no similar structure appears in the ISU chassis (501). As the ISU chassis (501) will be inside the vehicle, the framework (413) is unnecessary as the FLIR system is protected by the ISU housing (109) and the vehicle itself.

Figure 7:
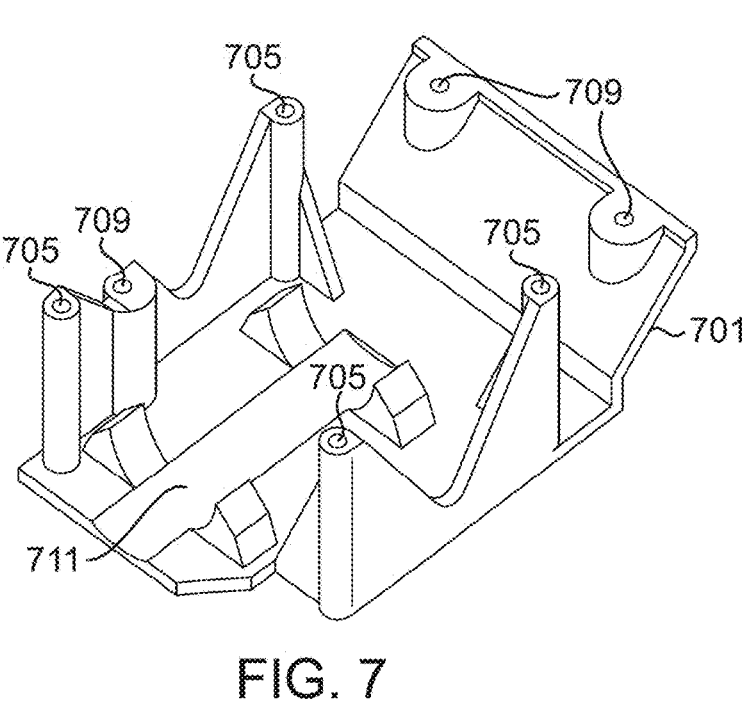
FIG. 7 shows a perspective view of an embodiment of an Integrated Detector Dewar Cooler Assembly (IDDCA) support for mounting the IDDCA indirectly to the chassis of FIG. 6 and in a new orientation relative to the other FLIR components.

Further, as the optics are positioned into the ISU housing (109) and are designed to utilize the existing eyepieces (105) and (107) and controls, the control mounts (411) of the infantry design are also unnecessary. Instead of positions for all of these elements, there is positioned a mounting bracket (511) which is designed to interface with a corresponding IDDCA support (701) as shown in FIG. 7. In the infantry chassis (401) of FIG. 5, the IDDCA (201) is mounted on the chassis (401) at a point (601) toward the back of the chassis (401) in the orientation of FIG. 5. This is also visible in FIG. 4 with the IDDCA (201) mounted to the chassis (401) at (601). In the chassis (501) of FIG. 6, however, the IDDCA (201) is mounted more directly underneath the chassis (501) and is not directly attached to the chassis (501). Instead, the IDDCA is mounted in the IDDCA support (701) of FIG. 7.

Because of barriers in the ISU housing (109) (which were originally used to mount the reticle projector (115)), repositioning of the IDDCA (201) is necessary. Inclusion of the IDDCA support (701) as shown in FIG. 7 provides for a specialized support and mounting. Tubing for the cooling liquid passing from the cooler to the detector cannot be strictly maintained due to the repositioning, and, thus, is also redesigned to accommodate the strict distance and bend requirement of the interface while accommodating the reorientation.

The support of FIG. 7 is specifically structured, according to various embodiments, to mimic and align with the ISU housing (109). As illustrated, mounting holes (709) are positioned to interface with three corresponding and exiting mounting points on the ISU housing (109). In certain embodiments, the mounting points on the ISU housing (109) may be those previously used for mounting of a reticle projector, repurposed via the IDDCA support (701). So configured, the IDDCA support (701) may, in certain embodiments, provide an attachment interface to the chassis (501). Still further, the IDDCA support (701) is shaped to provide a cradle (711) for the actual cooling components of the IDDCA (201), thereby enhancing not only ruggedness but also thermal dissipation of the system as a whole. The IDDCA support (701) is also attached to the chassis (501) via the attachment points (705). All of the indicated attachments will typically be via screws, but that is by no means required.

Figure 11:
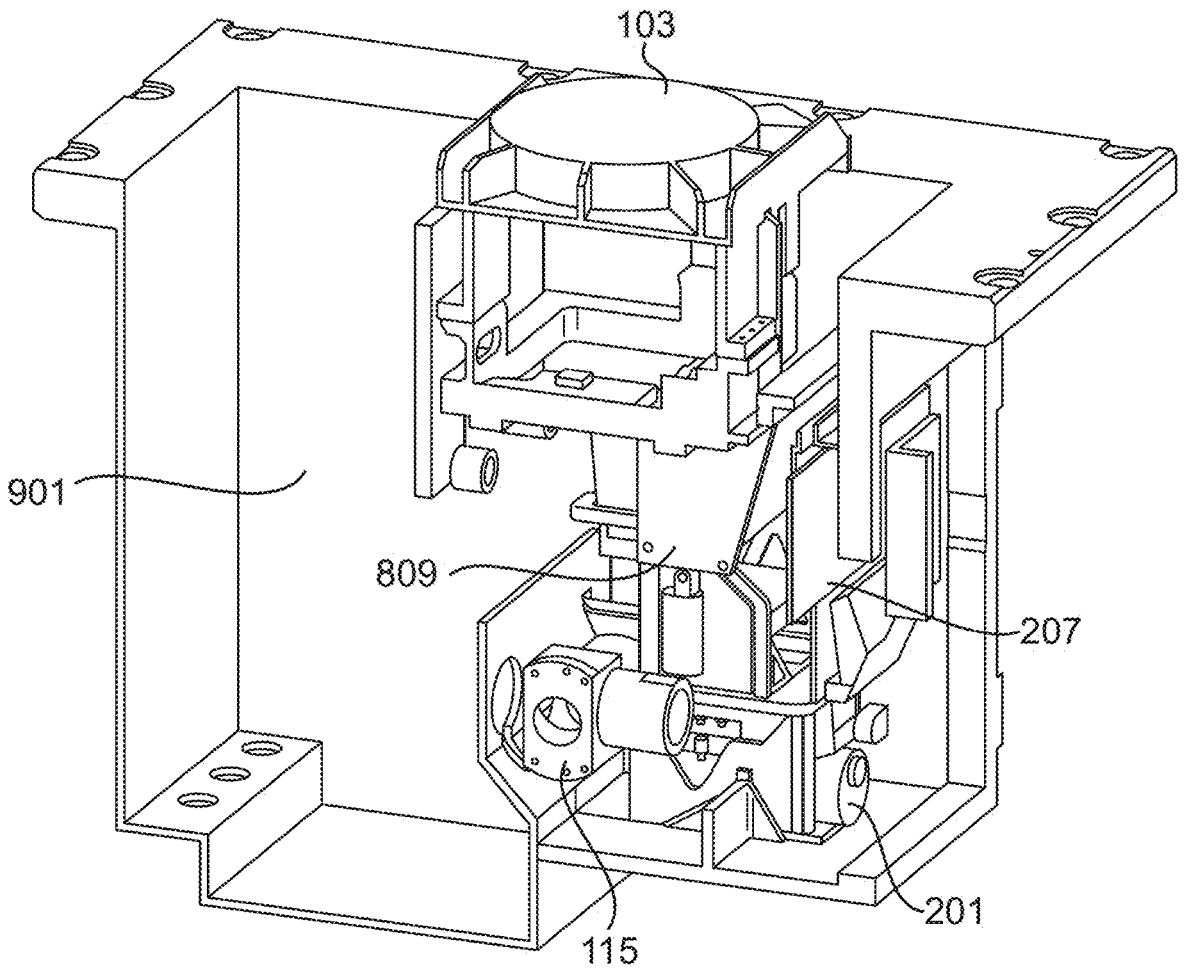
FIG. 11 shows the embodiment of FIG. 10, but now reversed and with the ISU housing, focusing system, and operator's eyepiece present.

The IDDCA support (701) will be held by the mounting points (709) typically slightly above a floor level of the ISU housing (109). This is best illustrated in FIG. 11. Because of the gap, space between the ISU housing (109) and the IDDCA support (701) may be filled with a material for vibration dampening, a material with additional thermal transfer and/or dissipation, or any other material (or no material). Of course, it should be understood that in additional or alternative embodiments, the relative position of the IDDCA support (701) may be adjusted, as desirable and/or advantageous relative to the ISU housing (109).

Figure 8:
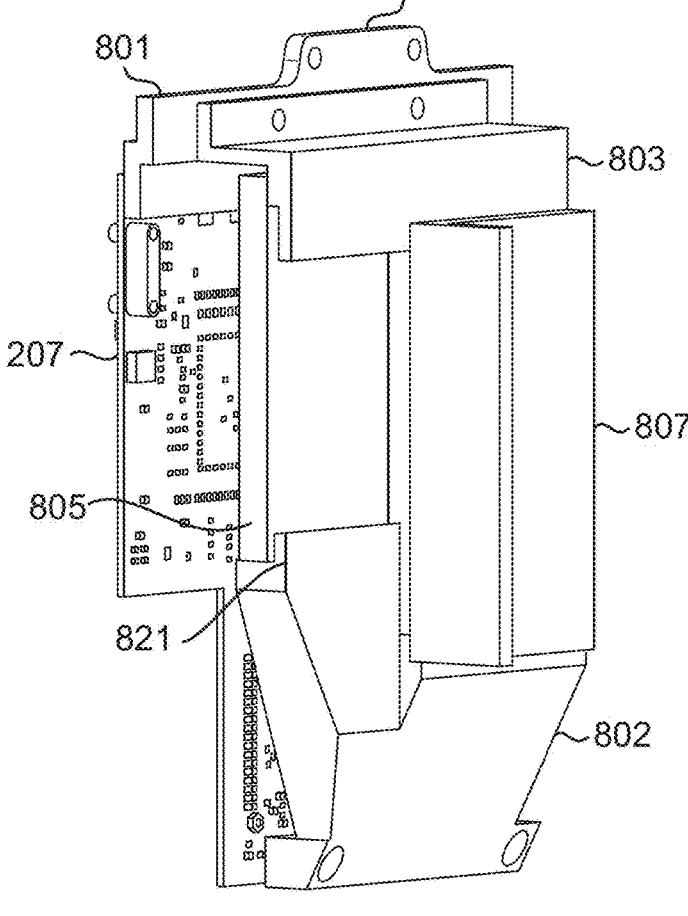
FIG. 8 shows a perspective view of a new electrical support with the existing Video Image Processing (VIP) board and other electronic circuits in place.

FIG. 8 provides an embodiment of the other major new part of the mounting structure in addition to the new chassis (401) and IDDCA support (701). FIG. 8 provides for an electrical mounting assembly (801) to provide for the mounting of the VIP card (207) and other electrical components (805) and (807). This provides for a repositioning of the VIP card (207) to clear it out of the way of the optical path for the commander's eyepiece (107). Other electrical components, processors, and the video control systems may also be included as part of the electrical components (805) and/or (807). The associated video interface processor (VIP) card (207) can also be repackaged to accommodate the above-described optical pathway from a beam splitter (115) to a commander relay (107).

To position these electrical board components, the mounting assembly (801) will typically comprise three spaced pieces (802), (803), and (804) which together with the boards (207), (805) and (807) together form a coherent structure. The pieces of the mounting assembly (801) are a lower piece (802), and two upper pieces (803) and (804). The lower piece (802) is designed to be of generally inverted trapezoidal form and serves, by providing a base (821) with stepped shelves (823), to act as a support for the various circuit board boards and electrical components (207), (805), and (807). It also serves to attach the boards (207), (805), and (807) at their lowest point to the chassis (501). At the opposing end of the assembly (801) are two upper brackets (803) and (804). These connect to each other and serve to hold the top portions of the circuit boards (207), (805) and (807) together and to the upper portion for the chassis (800). The boards (207), (805), and (807) are all, therefore, securely mounted and positioned in new positions on the chassis (501) and clear of the relay for the commanders eyepiece (107). In an embodiment, there is also included a shield component (809)) which acts to enclose, shield, and support the various optical components on the chassis (501).

In an embodiment, accompanying the above-described electrical boards (805) and (807) and/or incorporated therein, will be video combiner circuit card(s) providing multiple enhanced functionalities. For example, the video combiner can translate upgraded information and parse it out to the beam splitter (115) in a way the ISU or operator expects to receive it. With the ISU reticle projector (113) removed, the functions thereof may be replaced by the video combiner paired with an Organic Light-Emitting Diode (OLED) display (not shown). To do this, the video combiner will receive the FLIR image and overlay it with operator selected reticles. This provides the combined image to the user through the OLED display which is then visible via the beam splitter (115) via both the operator eyepiece (105) and commander eyepiece (107). Replacing the analog ISU reticle projector (113) with a software-based system offers specific advantages in survivability and may allow for an increased capability through software upgrades.

If there is a specific need for additional information displayed to an operator not currently displayed on the legacy systems, the video combiner could allow for customization, where software would be installed to enable enhanced information display states. Contributing to the system robustness the previously mechanical adjustment (119) of the reticle azimuth will be replaced by a potentiometer that will interface with the video combiner. Additionally, pairing the inherent upgraded components with the video combiner, could introduce more pertinent information to an external video display. In addition to the commander, others inside of the vehicle platform could be displayed the enhanced image of the night sight, and possibly additional information the system might have access to help with operational/situational awareness of other team members. The video combiner will react to operator input and provide the necessary video configuration to satisfy the legacy ISU states and possibly more.

Additionally, and/or alternatively, accompanying the above-described electronics is an OLED optical interface, which may be configured to generate a full and clear night sight image and/or reticles to the ISU beam splitter (115), which will in turn provide overlayed images to a user of the system, through the legacy eyepieces (105) and (107). Newly designed lenses for the eyepieces (105) and/or (107) will, in certain embodiments, match the entry magnification of the beam splitter (115) so that an OLED image can be seen clearly by all users. In an embodiment, a custom housing will encase the OLED display and lens(es) and position the components in the necessary light path.

Figures 9, 10:
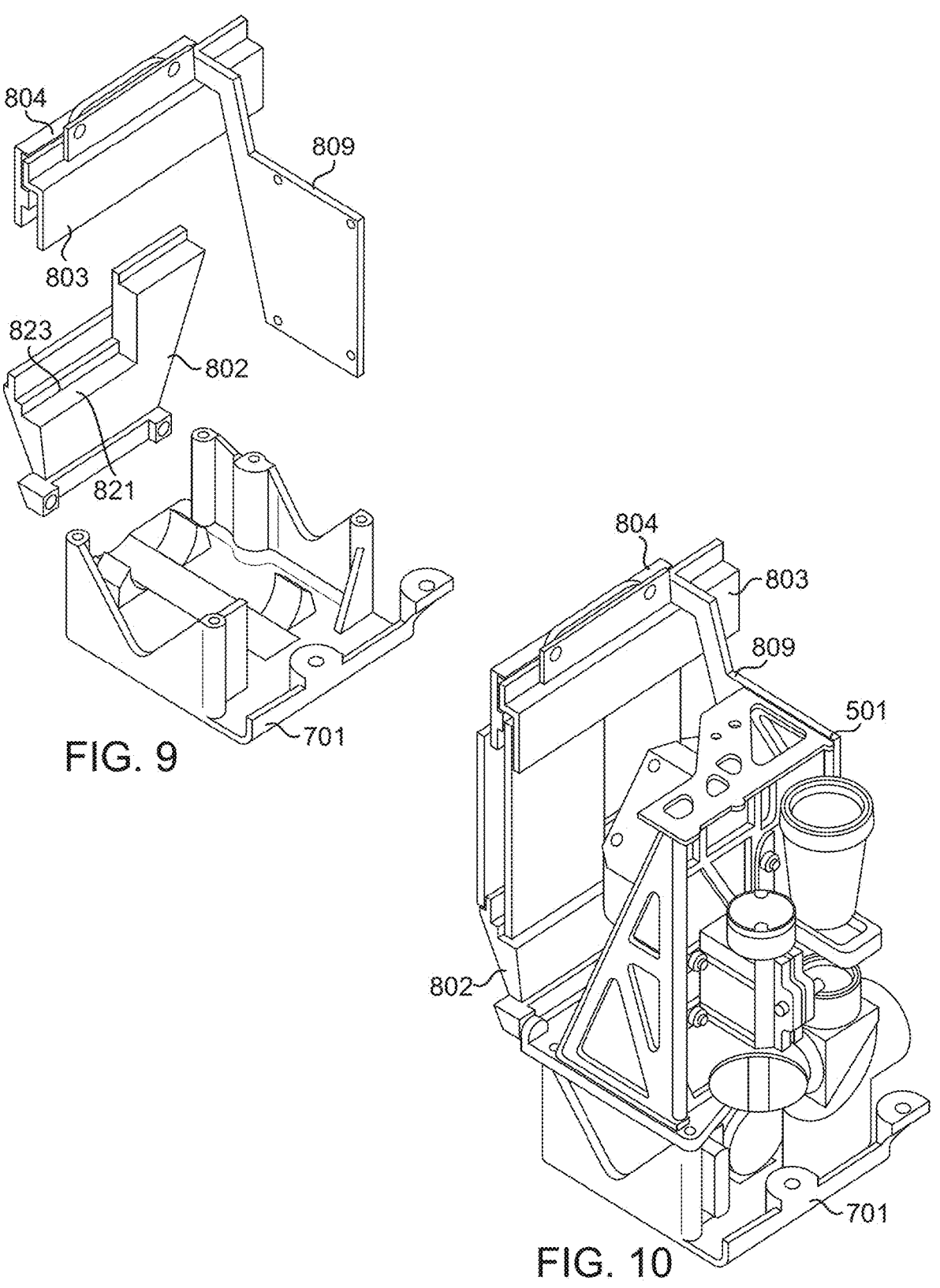
FIG. 9 shows a perspective view of the IDDCA support, electrical support, and shield in their relative positions but without the ISU housing, chassis, or any of the FLIR or electrical board components present.
FIG. 10 shows the elements of FIG. 9 in their same position, but with the chassis, FLIR, and electrical board components present.

FIGS. 9-11 provide for visualization of the ISU system assembled with the FLIR components from an infantry system mounted using the structures discussed herein. FIG. 9 shows the various supports (701) and (801) (components other than the chassis (501)) with the FLIR components removed to show how they will be arranged relative to each other in an embodiment. FIG. 10 then shows the assembly of FIG. 9 with the position of those elements remaining the same but the chassis and the FLIR components being added. FIG. 11 then shows the assembly of FIG. 10 positioned within an existing ISU housing (109). For clarity, in FIG. 11, there is also included the existing ISU beam splitter (115) which is used to provide for the image to be sent to both the two eyepieces (105) and (107) at essentially the same time and with both viewing the same image. The beam splitter (115) and its attendant housing, is preserved to as to maintain the existing positioning and operation in the manner expected. Further, use of the existing beam splitter (115) and housing also allows for the existing daylight system (101) (which would be in the opening (901) in FIG. 11 as can be seen by returning to FIG. 2) to be maintained without modification.

In operation, input from the optics (103) is fed into the new FLIR and processed by the IDDCA (201). The VIP (207) converts this to an image and with other electronics (805) and (807) provides the image to an OLED display with a software reticle provided thereon. This image is viewed from the beam splitter (115) via the operator eyepiece (105) or commander eyepiece (107). Further, what was mechanical control (119) of the targeting reticle (113) will typically now be converted from mechanical knob and dial movement to in software control of elements of the OLED by measuring the mechanical components movement using a potentiometer. As should be apparent, the resultant system will provide for mechanical control knobs and the eyepieces (105) and (107) of the ISU being in the same position and functioning in their original manner simply with the improved infantry FLIR system being used.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "rectangular" are purely geometric constructs and no real-world component is a true "rectangular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric or other meaning of the term in view of these and other considerations.

The invention claimed is:

1. A conversion methodology for converting a night vision system from an infantry mount to a vehicle mount, the methodology comprising:

providing a night vision system for a tripod-mounted TOW missile system;

removing said night vision system from said tripod-mounted TOW missile system;

mounting optical components of said night vision system on a new chassis in a same relative position;

positioning an Integrated Detector Dewar Cooler Assembly (IDDCA) from said night vision system in an IDDCA support;

attaching said IDDCA support to said new chassis in a manner which reorients and translates said IDDCA relative to said optical components;

removing an existing night vision system including a reticle projector from an Integrated Sight Unit (ISU) in a vehicle;

placing said IDDCA support and said new chassis into a space vacated by said existing night vision system in said ISU;

after said placing, viewing output of said IDDCA via a plurality of eyepieces originally used for viewing output of said existing night vision system of said ISU.

2. The conversion methodology of claim 1, further comprising:

positioning a video image processing (VIP) card in an electronics mounting assembly; and attaching said electronics mounting assembly to said new chassis.

3. The conversion methodology of claim 2, wherein said electronics mounting assembly comprises three separate pieces.

4. The conversion methodology of claim 3, wherein said three separate pieces either support a top and bottom of said VIP card.

5. The conversion methodology of claim 4 wherein said electronics mounting assembly attaches to said new chassis at a side of said chassis different from said IDDCA support.

6. The conversion methodology of claim 2, wherein said electronics mounting assembly includes a video combiner card for adding a software reticle to a video image produced by said VIP card.

7. The conversion methodology of claim 6, wherein said video image with said software reticle is visible to an existing beam splitter of said ISU for providing said video image with said software reticle to both an operator's eyepiece and a commander's eyepiece.

8. The conversion methodology of claim 7, wherein said video image with said software reticle is displayed on an organic light emitting diode (OLED) screen.

9. The conversion methodology of claim 2, wherein output of said VIP card is displayed on an organic light emitting diode (OLED) screen.

10. The conversion methodology of claim 1, wherein optical components of said night vision system mounted on said new chassis in said same relative position include a fold mirror and a scan mirror.

11. A conversion system for converting a night vision system from an infantry mount to a vehicle mount, the system comprising:

a new chassis, said new chassis mounting optical components of said night vision system in a same relative position;

an Integrated Detector Dewar Cooler Assembly (IDDCA) support, said IDDCA support mounting an IDDCA of said night vision system, said IDDCA support attached to said new chassis; and an electronics mounting assembly mounting a video image processing (VIP) card of said night vision system, said electronics mounting assembly attached to said new chassis;

wherein said night vision system is removed from a tripod-mounted TOW missile system;

wherein said conversion system is mounted into a housing for an Integrated Sight Unit (ISU) in a vehicle from which an existing night vision system including a reticle projector was removed; and wherein output of said IDDCA is viewed via a plurality of eyepieces of said ISU.

12. The conversion system of claim 11, wherein said electronics mounting assembly comprises three separate pieces.

13. The conversion system of claim 12, wherein said three separate pieces either support a top and bottom of said VIP card.

14. The conversion system of claim 11 wherein said electronics mounting assembly attaches to said new chassis at a side of said chassis different from said IDDCA support.

15. The conversion system of claim 11, wherein said electronics mounting assembly includes a video combiner card for adding a software reticle to a video image produced by said VIP card.

16. The conversion system of claim 15, wherein said video image with said software reticle is visible to an existing beam splitter of said ISU for providing said video image with said software reticle to both an operator's eyepiece and a commander's eyepiece.

17. The conversion system of claim 16, wherein said video image with said software reticle is displayed on an organic light emitting diode (OLED) screen.

18. The conversion system of claim 11, wherein output of said VIP card is displayed on an organic light emitting diode (OLED) screen.

19. The conversion system of claim 11, wherein said optical components of said night vision system mounted on said new chassis in said same relative position include a fold mirror and a scan mirror.

* * * * *